United States Patent [19]

Busseuil

[11] 4,261,592
[45] Apr. 14, 1981

[54] DEVICE FOR COUPLING TWO BICYCLES AS A TANDEM

[76] Inventor: Jacques Busseuil, Route du Sanatorium, Velars sur Ouche, 21370 Plombieres-les-Dijon, France

[21] Appl. No.: 68,399

[22] Filed: Aug. 21, 1979

[30] Foreign Application Priority Data

Aug. 30, 1978 [FR] France ............................ 78 25357

[51] Int. Cl.³ ...................... B60D 1/14; B62K 13/02
[52] U.S. Cl. ................................................. 280/292
[58] Field of Search ............... 280/292, 204, 493, 494

[56] References Cited

U.S. PATENT DOCUMENTS 2,756,069  7/1956  Manngarn ........................ 280/204

FOREIGN PATENT DOCUMENTS 16828 of 1902 United Kingdom ................ 280/204
14880 of 1904 United Kingdom ................ 280/292

Primary Examiner—John A. Pekar
Attorney, Agent, or Firm—Schwartz, Jeffery, Schwaab, Mack, Blumenthal & Koch

[57] ABSTRACT

The present invention relates to a device for coupling two bicycles as a tandem by means of a coupling bar, wherein said coupling bar is fixed to each of the two bicycles by a universal joint constituted by a first fork fast with one of the two ends of the bar, a cross piece articulated in said first fork by one of its arms, and a second fork articulated on the other arm of the cross piece, means being provided to fix said second fork to one of the bicycles, one arm of a cross piece being parallel to an arm of a second cross piece and the other two arms of the two cross pieces being coplanar when the two bicycles are in the same vertical plane.

10 Claims, 4 Drawing Figures

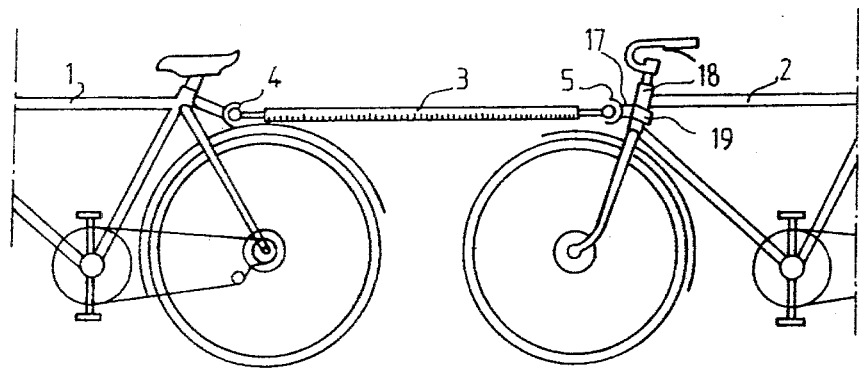
FIG_1
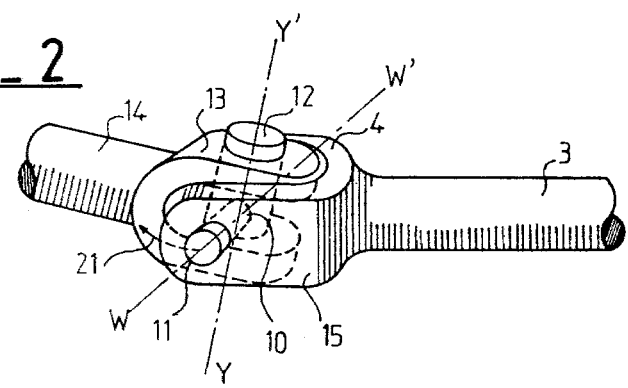
FIG_2
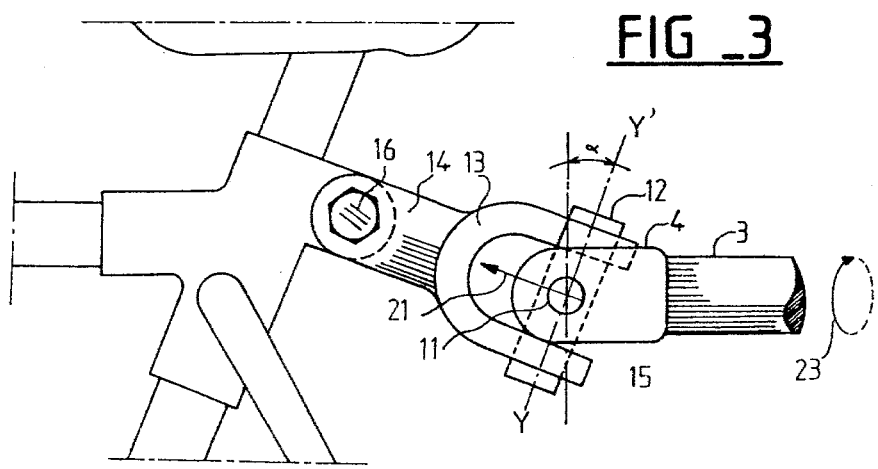
FIG_3

FIG_4
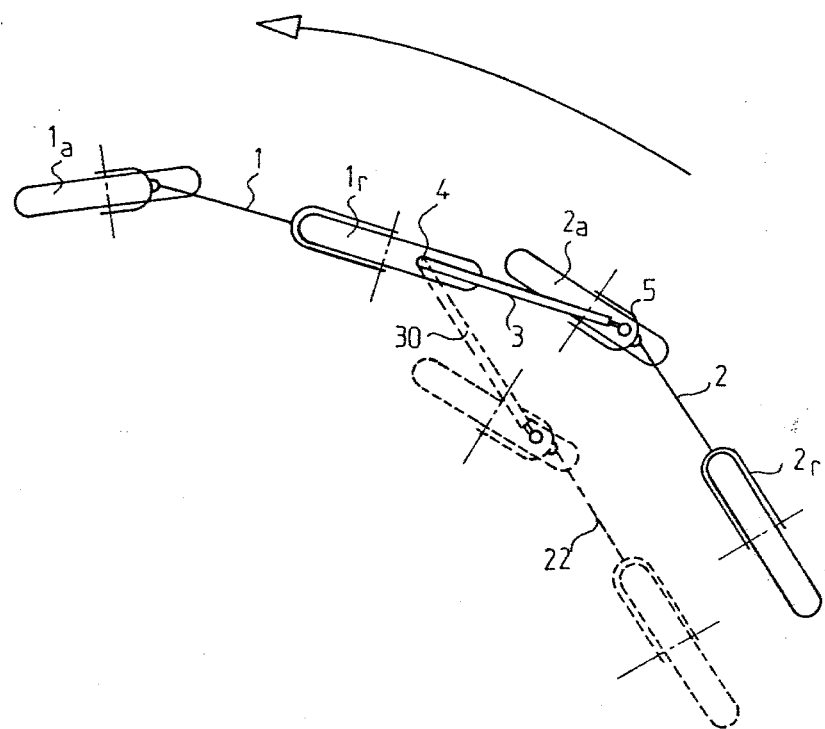

DEVICE FOR COUPLING TWO BICYCLES AS A TANDEM

The present invention relates to bicycles and more particularly to a device for coupling two bicycles so as to constitute a tandem and thus obtain all the advantages of this type of riding machine, without having certain drawbacks thereof.

It is known for example that, in a conventional tandem, the two crank gears rotate in synchronism, this obliging the two cyclists to pedal at the same time and at the same rhythm; it is therefore not possible for one of them to rest momentarily, carried along by the other. It is also known that, to store it, a tandem requires a length which is almost that of a small automobile and that it is not easy to transport such a machine in an automobile. On the contrary, two cycles can be stored easily side by side on the roof of an automobile.

To couple two bicycles to form a tandem poses problems of stability; if the saddle of the first is connected to the frame or handlebar of the second by a cable, the assembly is stable when the cable is stretched. However, the rear can never push the front; it cannot contribute to the resistance to advance which is mainly exerted on the front. Moreover, if the rear catches up with the front, a general fall is to be feared.

Neither is a connection by a rigid bar articulated in the manner of a knuckle joint on each machine satisfactory: if the rear machine pushes, any deviation from the general direction tends to accentate, because an oblique reaction force exerted on the rear machine for example tends to incline it towards the outside (to the right, for example); the cyclist will instinctively correct this by turning his handlebar to the right, then to the left to return into line; the assembly is unstable and it is virtually impossible to master this instability since the reaction is also exerted on the front bicycle, and the two cyclists are not able to coordinate their reflexes.

If the knuckle joints are replaced by universal joints of which the cross pieces are parallel, when the machines are in normal position, the connection is equivalent to the preceding one and the same phenomenon of instability appears during a ride. However, this is not the case if one of the universal joints has a horizontal arm and an oblique arm. The invention resides herein.

The invention relates to a device for coupling two bicycles by means of a coupling bar, wherein said coupling bar is fixed to each of the two bicycles by a universal joint constituted by a first fork fast with one of the two ends of the bar, a cross piece articulated in said first fork by one of its arms, and a second fork articulated on the other arm of the cross piece, means being provided to fix said second fork to one of the bicycles, one arm of the cross piece being parallel to an arm of a second cross piece and the other two arms of the two cross pieces being coplanar when the two bicycles are in the same vertical plane.

According to another feature of the invention, the forks are mounted on the coupling bar, on the one hand, and on the frames of the bicycles, on the other hand, in such positions that, when the bicycles are in the same vertical plane, parallel arms of the two cross pieces are horizontal.

In such a position, the concurrent arms of the two bicycles are such that one is vertical and the other makes with the vertical an angle $\alpha$ of between 10° and 45°.

The cross piece arm making an angle $\alpha$ with the vertical will be inclined rearwardly with respect to the vertical if this arm belongs to the cross piece located on the front bicycle side, and inclined forwardly if this arm belongs to the cross piece located on the rear bicycle side.

According to a particular embodiment of the invention, the two forks fast with the coupling bar are in the same plane, and the two forks made fast with the bicycles are in the planes of these bicycles, this resulting in each of the arms of each cross piece which is articulated on the coupling bar itself being horizontal, when the bicycles are in the same vertical plane.

According to the same embodiment of the invention, the fork of the front bicycle is fixed on said bicycle so that it is the arm of the cross piece of the front bicycle perpendicular to the one which is horizontal which makes a certain angle with the zenith, said angle being such that the angle that it forms with the coupling bar is close to 25°.

This results in that, if, during movement, the rear bicycle deviates from the vertical plane of the front bicycle, and if, therefore, the coupling bar deviates from this plane, it undergoes a rotation on itself; this rotation is transmitted by the rear universal joint, to the rear bicycle and causes it to swing to the left if it deviates to the right, and to the right if it deviates to the left.

The bicycles have, by construction, a certain caster angle which tends to cause the handlebar to turn on the side where it is inclined; the cyclist's normal reflex is to act in the same direction. These two combined effects produce a regulation which brings the rear bicycle back in the axis of the front bicycle; this regulation acts both in pushing action and in traction.

If the angle in question were zero, the regulation would not take place. If the angle in question is excessive, the regulation is over-abundant and produces oscillations which are impossible to master; with normal adult's bicycles of the same size, experience has shown that the best value of the inclination is about 25°.

According to a further feature of the invention, the angle of inclination is adjustable so as to allow the coupling of bicycles of different sizes, particularly a child's bicycle behind an adult's bicycle. To this end, the shaft member or rod of the rear fork of the front bicycle is in two parts, articulated on each other, one of the parts being fast with the frame, and their relative position may be blocked by any suitable means, for example by tightening a nut.

The bicycles may be provided permanently with a front or rear fork welded to the frame. The invention also provides means enabling these forks to be mounted on ordinary frames by fixing members adapted to the most recent models of bicycles.

The invention will be more readily understood on reading the following description with reference to the accompanying drawings, in which:

FIG. 1 shows two bicycles coupled as a tandem in accordance with the invention.

FIGS. 2 and 3 show the universal joint of the front bicycle in perspective and in elevation, respectively.

FIG. 4 is a diagram explaining the relative position of two bicycles coupled according to the invention, when the first bicycle approaches a bend.

Referring now to the drawings, a front bicycle 1 and a rear bicycle 2 are coupled by a rigid coupling bar 3 connected to the front bicycle by a universal joint 4 and to rear bicycle by a universal joint 5. The invention relates to the bar 3 and the universal joints 4 and 5.

FIGS. 2 and 3 show more clearly the front universal joint 4 which is constituted by a cross piece 10 composed of two arms 11 and 12 at right angles to and fast with each other. The arm 11 is articulated in a fork 15 fast with the coupling bar 3; the arm 12 is articulated in a fork 13 fast with a shaft member or rod 14 which is, itself, fast with the frame of the front bicycle by a fixation enabling it to give it a certain inclination with respect to the horizontal; it has been assumed, in the embodiment shown, that this fixation is ensured by the bolt and nut device 16 which, on a bicycle, generally allows the height of the saddle to be adjusted. Any other fixing means, such as a collar or a clamp, may suit. Such a fixation may also be welded, from the beginning, directly on the chassis. However, a means for adjusting the inclination of the shaft member 14 is preferably provided for reasons which will appear hereinbelow. Let $\alpha$ (FIG. 3) be the inclination of the shaft member 14 with respect to the horizontal when the bicycle 1 is vertical; $\alpha$ is also equal to the angle that the arm 12 makes with respect to the vertical.

The rear universal joint 5 (FIG. 1) is symmetrical with respect to the universal joint 4. Its shaft member 17 is fixed to the head tube 18 of the rear bicycle 2, either by means of a collar 19 or by welding, or by any other means. It has been assumed, in FIG. 1, that the shaft member 17 is in line with the bar 3 when the two bicycles follow the same path.

If the angle $\alpha$, defined hereinabove, were zero, and if one of the bicycles is vertical, the other is also vertical, even if the two bicycles are not in the same plane, whether their two planes are parallel or not. In normal running, their relative position is indifferent, and they could even almost be ridden side by side.

If the angle $\alpha$ is not zero, and if the rear bicycle deviates to the right or to the left, the planes of the two bicycles do not remain parallel. In fact, starting from the position of FIG. 1 where the two bicycles are assumed to be in the plane of the figure, if the bicycle 2 deviates to the left, the bar 3 comes in front of the plane of the figure, turning about the universal joint 4, more precisely turning about the centre of the cross piece 10 of this universal joint. In the course of this rotation, the ends of the arm 11 of this same cross piece move over arcs of the same circle perpendicular to axis Y–Y' of the arm 12; these arcs, represented by arrow 21, are therefore not in a horizontal plane, and consequently, in the course of its rotation about the universal joint 4, the bar 3 (whilst remaining horizontal) undergoes a slight torque in the direction shown by arrow 23 (still assuming that the rear bicycle is deviating to the left).

This rotation is transmitted to the rear bicycle by the universal joint 5. As announced, the planes of the two bicycles are no longer parallel. The rear bicycle, which is assumed to have deviated to the left, is urged by a torque tending to incline it to the right, and by reaction, the front bicycle is urged by a torque tending to incline it to the left.

Due to the caster angle which the bicycles normally have by construction, in order to give them stability when they are loaded, and due to the conventional reflexes of the cyclists, the front bicycle is urged to the left to join the path of the rear bicycle, and the rear bicycle is urged to the right to join the path of the front bicycle. Thus a self-regulation mechanism is effected which stabilises the two bicycles on the same path, even in the case of a bend. As has already been said, the regulation is inoperative if the angle $\alpha$ is zero, and the rate of regulation increases with $\alpha$. Above a certain value, it is in excess, and causes oscillations resulting the two bicycles deviating with respect to each other.

Experience has shown that, for adults' bicycles of the same size, the optimal value of $\alpha$ is about 25°.

In the preceding embodiment, it has been assumed that the rear universal joint 5 has a vertical arm and a horizontal arm, and that, in the front universal joint 4, there is a horizontal arm 11, parallel to the corresponding arm of the universal joint 5, and an oblique arm 12, and it is recalled that this inclination plays a fundamental role in the regulation. Due to this inclination, the front universal joint acts as regulator, the rear universal joint being passive. A regulation would thus occur if the rear universal joint 5 were regulator, the front universal joint being passive. The inclination $\alpha$ of the rear universal joint must then be made forwardly.

However, the two cases are not equivalent if the bicycles are in a bend.

To illustrate this, reference will now be made to FIG. 4 which is a plan view, where it is assumed that the front bicycle 1 (shown schematically by its front and rear wheels $1_a$ and $1_r$) and the rear bicycle 2 (shown schematically by its front and rear wheels $2_a$ and $2_r$) are turning around a point 0. The axes of the four wheels all pass through 0.

The front universal joint 4 being regulator, the effect of the regulation is to maintain the bar 3 in the plane of the front bicycle, as shown in the figure, and the two bicycles follow substantially the same path.

If the rear universal joint 5 is regulator, the universal joint 4 being passive, the effect of the regulation is to bring and maintain the bar 3 in the plane of the rear bicycle. The position of the rear bicycle is then the one shown at 22 in broken lines, the coupling bar being at 30. It is seen that the second bicycle then follows a substantially closer path than the first. If only two bicycles are coupled, this is acceptable. However, if there are more than two bicycles behind one another, the first case is preferable, in order that the bicycles of the line follow substantially the same path.

Whether the front universal joint or the rear universal joint is concerned, a means for making it act the role of regulator consists in that the inclined arm is the one which is articulated on the fork fast with the bar, and not the fork made fast with the frame of the corresponding bicycle.

FIG. 2 which, up to now, has shown a front universal joint-regulator, may also represent a rear universal joint-regulator. The coupling bar is then at 14 and reference 3 would correspond to the shaft member 17 of FIG. 1. In fact, if the oblique arm is articulated on the fork fast with the bar, the inclination of this arm must be in the direction opposite the case of the oblique arm being articulated on the other fork. Therefore it is inclined forwardly if it is question of the front universal joint, and rearwardly in the case of the rear universal joint. The means for obtaining the inclination may be the use of a bar bent towards its end preferably with an articulation enabling $\alpha$ to be adjusted and blocked at a suitable value. The fork may also be welded obliquely on the bar.

The position of the forks of a passive universal joint (horizontal or vertical) is indifferent.

It is also possible that the front and rear universal joints be both regulators. In this case, the effect of the regulation is to bring the coupling bar both in the plane of the front bicycle and in that of the rear bicycle, rendering the bends difficult. This is why, unless there are particular reasons, it is advantageous if only the front universal joint is regulator.

It is possible to couple a child's bicycle behind an adult's. In this case, the bar 3 is not horizontal and the angle α must be calculated with respect to the planes perpendicular to this bar.

It is, of course, possible for at least one of the bicycles to be provided with driving means.

What is claimed is:

1. In a device for coupling two bicycles as a tandem by means of a coupling bar connected to each of the two bicycles, comprising first and second universal joints respectively constituted by first and second forks secured to the respective ends of the bar, first and second cross pieces each having first and second arms, said first arms being respectively articulated in said first and second forks, said second arms being respectively articulated on third and fourth forks operatively connected to respective bicycles, the improvement comprising means for rigidly securing said third and fourth forks on said respective bicycles in such a manner that the respective first arms of the cross pieces are parallel and the second arm of the first cross piece is inclined with respect to the second arm of the second cross piece when the two bicycles are in the same vertical plane.

2. The device of claim 1, wherein the parallel arms of the two cross pieces are horizontal when the two bicycles are in the same vertical plane.

3. The device of claim 2, wherein, when the two bicycles are in the same vertical plane, the two second arms of the first and second cross pieces respectively are aligned such that the second arm of said second cross piece is vertical and the second arm of said first cross piece makes with the vertical an angle α of between 10° and 45°.

4. The device of claim 3, wherein the angle α is approximately to 25°.

5. The device of claim 4, wherein the second arm of the first cross piece is secured on the front bicycle, and this arm is inclined rearwardly with respect to the vertical.

6. The device of claim 4, wherein the second arm of the first cross piece is secured on the rear bicycle, and this arm is inclined forwardly with respect to the vertical.

7. In an apparatus for tandemly coupling vehicles such as bicycles and the like wherein an elongated coupling bar connects two tandemly arranged vehicles by means of respective first and second universal joints located at each end of the bar, each universal joint comprising a fork formed on respective ends of the bar and a cooperating fork formed on a distal end of each of two shaft members, one of the shaft members being carried by one of the vehicles and the other shaft member being carried by the other vehicle, the shaft members each extending toward the coupling bar from the respective vehicles, each universal joint further comprising a cruciform articulation member having first and second generally perpendicular arms, the first arm of each the cruciform articulation members being mounted for articulation by the fork formed on the respective ends of the coupling bar, the second arm of each of the cruciform articulation members being mounted for articulation by the cooperating fork formed on the respective distal ends of each of the shaft members, the respective first arms being parallel and the respective second arms being inclined with respect to each other when the vehicles are disposed in the same vertical plane, and a means for rigidly mounting each of said forks to the respective vehicle through said respective shaft members.

8. The apparatus of claim 7, wherein the longitudinal axis of one of the shaft members forms an angle α with the horizontal of between 10° and 45°, the longitudinal axis of the other shaft member being substantially horizontal when the apparatus is in normal use.

9. In the apparatus of claim 8 wherein the angle α is approximately 25°.

10. The apparatus of claim 7, wherein the longitudinal axis of the coupling bar is substantially horizontal when the apparatus is in normal use.

* * * * *